US005454493A

United States Patent [19]

Laroche et al.

[11] Patent Number: 5,454,493

[45] Date of Patent: Oct. 3, 1995

[54] APPARATUS FOR THE DISTRIBUTION OF PARTICULATE MATERIAL UPON A SURFACE

[75] Inventors: Pierre Laroche, Nalinnes; Yvan Cherton, Ham-Sur-Heure, both of Belgium

[73] Assignee: Glaverbel, Brussels, Belgium

[21] Appl. No.: 176,702

[22] Filed: Jan. 3, 1994

[30] Foreign Application Priority Data

Jan. 4, 1993 [GB] United Kingdom .................. 9300030

[51] Int. Cl.⁶ .................................................. G01F 11/10

[52] U.S. Cl. ................................ 222/185.1; 222/189.01; 222/414

[58] Field of Search .................................. 222/189, 414, 222/613, 614, 619, 623, 185, 181

[56] References Cited

U.S. PATENT DOCUMENTS

| | | | |
|---|---|---|---|
| 1,600,014 | 9/1926 | Purrmann | 222/189 X |
| 2,278,948 | 4/1942 | Rodli et al. | 222/623 X |
| 2,369,983 | 2/1945 | Rodli et al. . | |
| 2,833,542 | 5/1958 | Martin et al. . | |
| 2,895,647 | 7/1959 | Wald, Jr. et al. | 222/189 |
| 3,289,899 | 12/1966 | Miller et al. . | |

FOREIGN PATENT DOCUMENTS

| | | |
|---|---|---|
| 0129551B1 | 2/1989 | European Pat. Off. . |
| 2522702 | 9/1983 | France . |
| 2109381 | 4/1990 | Japan . |
| 1174431 | 12/1969 | United Kingdom . |
| 1501314 | 2/1978 | United Kingdom . |
| 1505068 | 3/1978 | United Kingdom . |
| 2175224 | 11/1986 | United Kingdom . |
| 2193205 | 2/1988 | United Kingdom . |
| 2208078 | 2/1989 | United Kingdom . |
| 2214915 | 9/1989 | United Kingdom . |

*Primary Examiner*—Andres Kashnikow
*Assistant Examiner*—Kenneth Bomberg
*Attorney, Agent, or Firm*—Spencer, Frank & Schneider

[57] ABSTRACT

An apparatus for the distribution of particulate material including glass beads onto one of freshly applied paint or polymer material applied to a surface, includes a housing having defined therein an upper chamber for the receipt of particulate material and a lower chamber including a downwardly directed opening. The housing additionally has feeding control means positioned between the upper chamber and the lower chamber to allow the particulate material to pass in a controlled manner from the upper chamber to the lower chamber. At least one distribution grid is positioned in the lower chamber through which substantially all of the particulate material to be applied onto the surface passes to the downwardly directed opening.

13 Claims, 4 Drawing Sheets

APPARATUS FOR THE DISTRIBUTION OF PARTICULATE MATERIAL UPON A SURFACE

BACKGROUND OF THE INVENTION

1. Field of the Invention

The present invention relates to apparatus for the distribution of particulate material onto a surface, in particular to an apparatus for the distribution of glass beads onto a line of paint and/or polymeric material previously applied to the surface of a road or the like, to produce retro-reflective traffic markings.

2. Description of the Related Art

In the application of traffic markings to road surfaces, it is generally desirable to apply a reflectorised material in the form of small glass spheres or beads to the marking for increasing night-time visibility and further extending the life of the marking. The glass beads may be applied with a paint binder in a single operation. An alternative method of application is to apply the paint binder separately from a paint application machine and then immediately follow the paint binder with an application of the glass beads from a distribution apparatus associated with the machine, from which the beads are dispensed by gravity flow.

It is important to dispense the glass beads at a uniform rate and evenly over the width of the marking, without spillage of the beads onto unwanted areas which can be both wasteful and may be damaging to the environment.

In U.S. Pat. No. 3,289,899 (Miller et al) there is described an apparatus for the distribution of glass beads onto a road surface in which the apparatus comprises a housing, an upper chamber within the housing for the receipt of glass beads, a lower chamber within the housing having a downwardly directed opening, and a distribution control valve positioned between the upper and lower chambers to allow the glass beads to pass in a controlled manner into a lower chamber, from where they fall through the downwardly directed opening onto the road surface. The distribution control valve is in the form of a conically-shaped spreader which is movable in a vertical direction from a position closing an opening between the upper and lower chambers to a position in which this opening is partially open. The glass beads then fall through an annular space between the surface of the spreader and the inside surface of the lower chamber and fall primarily in the form of a ring onto the road surface. The disadvantage of the apparatus described in U.S. Pat. No. 3,289,899 is that there is an accumulation of beads at the edges of the marking line and a shortage of beads at the centre of the marking line. Thus with this apparatus it is difficult to achieve uniform distribution of the beads on the road surface.

In European Patent EP129551-B (Road Construction Authority), there is described a glass bead applicator in which glass beads are stored in a pressurised hopper and fed to a nozzle from which they are projected, by means of compressed air, directly on to the road surface. This arrangement does not however result in a uniform distribution of the glass beads; there is a tendency for the beads to accumulate at the centre of the marking line. Further, the glass bead hopper must be pressurised and it is necessary to provide means for dehydrating the compressed air used to pressurise the hopper if one is to avoid condensation of moisture on the beads which could generate problems in their discharge from the nozzle.

It is an object of the present invention to provide an apparatus for sprinkling glass beads or other particulate material onto a surface, such as onto a line of freshly applied paint and/or polymer material applied to a road surface, in a manner which enables more uniform distribution to be achieved over a defined area in a simple and reliable manner.

SUMMARY OF THE INVENTION

According to the invention, there is provided an apparatus for the distribution of particulate material onto a surface, characterised in that the apparatus comprises a chamber having a downwardly directed opening and feeding control means positioned above said chamber to allow the particulate material to pass in a controlled manner to said chamber and in that, positioned in said chamber, is at least one distribution grid, through which substantially all the particulate material passes to the downwardly directed opening to be applied to said surface.

Thus, the invention provides an apparatus which enables glass beads to be deposited onto a material to be solidified, such as paint or a polymerisable material, by uniform and reliable distribution onto the surface before the complete hardening of the material. The distribution grid plays an essential role in obtaining the beneficial results of the invention. It is indeed surprising that such a simple construction is able to achieve a uniform distribution of the glass beads onto the marking line material.

The principal application of the process concerns the formation of reflective traffic markings on the ground. Usually, the apparatus according to the invention will be associated with a paint and/or polymer application machine, such as being fixedly coupled thereto or integral therewith. A paint or polymer coating is applied to the ground, ie to the road surface, in the form of a line of desired width and the glass beads are dispersed thereon from the dispensing apparatus before the hardening of the paint or the coating. In practice, a line of constant width is formed by the continuous deposition of paint and then the glass beads are applied in a desired width. The glass beads penetrate the fresh paint to a greater or lesser extent, depending upon the type of glass beads which are used and the treatment of the surface.

One specific application for which the apparatus according to the invention is particularly useful is the formation of reflective traffic markings based on polymerisable paint, where the initiator for the polymerisation reaction, generally a peroxide, is carried on the surface of the glass beads. It is important that these glass beads are uniformly distributed over the paint to allow for uniform hardening thereof and to obtain a uniform retro-reflection. Further, it is important that the glass beads do not fall outside the width limits of the paint line in order to avoid pollution of the immediate environment by the peroxide.

The particulate material which can be used in the apparatus according to the invention is, for example, glass or other vitreous material, in spherical form, ie in the form of beads. For example, glass beads having a size of from 100 μm to 700 μm have been found to be suitable. As an alternative, glass beads having a size of from 1 to 2.4 mm have also been found to be suitable. The beads may be surface treated to modify the physico-chemical properties of their surfaces. British patent specification GB 2 208 078 (Glaverbel) discloses beads which are suitable for incorporating in a polymer matrix, the beads carrying an initiator or catalyst for the polymerisation of the matrix. For example, glass beads having a nominal diameter of from 150 to 250

μm are coated with benzoyl peroxide and a silane from a toluene solution and are suitable for incorporation in an acrylic resin matrix. British patent specification GB 2 214 915 (Glaverbel) discloses glass beads whose surfaces have been treated to control the surface tension thereof, thereby to ensure the good dispersion thereof in a polymer matrix. For example, glass beads treated with a methanol/water solution of β-(p-chlorophenyl) ethylsilane at a level of 0.1 g/Kg to reduce the surface tension to 45 mN/m are suitable for incorporation in a high viscosity acrylic matrix. British patent specification GB 2 175 224 (Glaverbel) discloses a method of modifying the wettability of glass beads by coating with a hydrophobic material and an oleophobic material. For example, glass beads having a size of from 200 μm to 600 μm are coated with gamma-aminopropyltriethoxysilane at a level of 0.04 to 0.08 g/Kg and with potassium fluoroalkyl sulphonate at a level of 0.008 to 0.020 g/Kg.

Any of the glass beads disclosed in the above mentioned patent specifications can be used with advantage in the apparatus according to the present invention.

Preferably, the chamber is constituted by a lower chamber located within a housing having an upper chamber for the receipt of particulate material, the feeding control means being positioned between the upper and lower chambers to allow the particulate material to pass in a controlled manner from the upper chamber to the lower chamber.

The feeding control means may comprise a vibrating inclined surface which is used to control the feeding of the glass beads from the upper to the lower chambers. The quantity of the glass beads which fall from the inclined surface onto the distribution grid may be a function of the intensity of vibration of the inclined surface. As an alternative, a rotating disc with a scraper may also be used as the feeding control means, where the speed of rotation of the disc may be used to control the quantity of glass beads which are fed to the distribution grid. It is also possible to use, as the feeding control means, a spreading cone of the type described in U.S. Pat. No. 3,289,899 (Miller et al) referred to above. As a further alternative, the feeding control means may comprise means for projecting the beads towards the distribution grid, such as a compressed air nozzle positioned above the distribution grid. Where the supply of glass beads is under pressure, control of the quantity fed to the distribution grid may be controlled by controlling the degree of pressure applied.

Preferably, the feeding control means comprise a rotatable distribution roller. Such a roller achieves in a simple manner a precise dosage of the glass beads falling onto the paint.

Where in the apparatus according to the invention, a rotatable distribution roller is used as the feeding control means, this may be formed with scoops or pockets which pick up the glass beads from the upper chamber and feed them to the lower chamber as the roller rotates. For example there may be used a roller having a number of cavities provided on its surface as described in French Patent publication FR 2552702 (Walter Hofmann GmbH). Preferably the rotatable distribution roller is a grooved dosing roller. This may be cylindrical or conical and may have a length equal to the smallest width of line upon which the particulate material is to be deposited, for example 15 cm. The speed of rotation of the dosing roller determines the amount of particulate material which is deposited. By linking the rotation of the dosing roller with the movement of the apparatus, it is ensured that a constant quantity of particulate material is deposited per unit length of the marking line, irrespective of the speed of movement of the apparatus. This linking can be achieved in a convenient manner where the apparatus is provided with ground engaging means, which enable the apparatus to be moved over the ground in a direction generally perpendicular to the axis of the dosing roller. The ground engaging means may be constituted by one or more ground engaging wheels, which are linked to the rotatable distribution roller to cause the latter to rotate at a speed dependent upon the speed of the apparatus over the ground. Usually the ground engaging means will be such as to restrain the dispensing apparatus to follow exactly the path of the paint application device, that is to constrain the machine with the distribution apparatus associated therewith to one direction of movement only. We prefer that the rotatable distribution roller is driven from a ground engaging wheel via a gear-box, such that the rotational speed of the roller is proportional to the linear speed of the apparatus over the road surface. By the provision of an adjustable gear-box it is possible to control the rate of deposition of the particulate material according to the width of the marking line, as will be explained in further detail below, according to the diameter of the glass beads and according to the desired retro-reflective effect.

The dosing roller may be formed of any suitable material such as metal (especially stainless steel) or a plastics material such as a fluoro-elastomer, in particular "Viton" (Trade Mark ex Dupont de Nemours or an anti-adherent material like "Teflon" (Trade Mark ex Dupont de Nemours). Some types of glass beads may adhere to a metal dosing roller causing its performance to be unreliable. Also, some metal rollers may be subject to corrosion resulting from condensation of moisture thereon, which may occur if the ambient temperature falls below the dew point. In these cases a plastics material dosing roller is preferred.

The glass beads fall from the dosing roller into the lower chamber wherein is positioned one or more distribution grids. We have found that more than two distribution grids are preferred, such as four. The glass beads fall through the openings in the grids, from one grid to the next and ultimately onto the paint freshly applied to the ground. The distribution grids preferably are in a generally horizontal disposition, generally parallel to the axis of the dosing roller. The passage of the glass beads through the mesh openings in the distribution grids is aided by any vibration inherent in the use of the apparatus, such as may be picked up from an uneven road surface or such as may be inherent in any motor mounted on the apparatus, such as for example a drive motor or compressor motor where the glass beads are fed to the upper chamber by pneumatic means, or associated with the paint applicator mounted on the same machine. A small electric motor, such as an eccentric motor or a motor having inherent instability, may also be used specifically to generate further vibration. The mesh openings in the distribution grids are preferably from 750 μm to 400 μm, most preferably from 1000 μm to 1800 μm for the range of smaller glass beads and from 2 to 8 mm, most preferably from 3 to 6 mm for the range of larger glass beads. The mesh openings in the distribution grids should be greater than the maximum diameter of the glass beads, such as preferably from 2 to 3 times as large. If the openings are too large, however, such as more than 4 times as large as the maximum diameter of the glass beads, uniform distribution of the beads over the whole surface of the distribution grid may not be assured. If, on the other hand, the mesh openings in the distribution grid are too small, such as less than 1.5 times as large as the maximum diameter of the glass beads, blockages may occur leading to non-uniform distribution. However, the optimum size of the mesh openings will depend on the number of distribution grids used, larger mesh openings being suitable the greater the number of distribution grids.

Preferably the distribution grids are mounted in a removable manner, enabling the mounting of a grid with an appropriate mesh size, according to the size of glass beads which are being used and also for ease of cleaning. A convenient manner of achieving this is to provide each distribution grid, or a group of such grids, in the form of a rectangular drawer which may be slid into and out of position in the lower chamber of the apparatus.

According to a particularly preferred embodiment of the invention, the second chamber comprises support means for distribution grids of a number of sizes, in particular enabling distribution grids having a length greater than the axial length of the dosing roller to be mounted therein. Thus, where the dosing roller has a length of 15 cm, distribution grids having any length from 15 cm to say 35 cm may be provided, according to the desired width of the marking line. It is indeed surprising that with a dosing roller shorter than the width of the desired marking line, uniform distribution of the glass beads over the surface of such larger distribution grids and thus, ultimately, over the road surface can be achieved. Uniformity of distribution is assisted in this case, where the dosing roller is positioned centrally with respect to the distribution grids. Where a wider distribution grid is used, it will be necessary to adjust the gear ratio in the drive to the dosing roller to thereby increase the amount of glass beads which are dosed to the distribution grids, ie the rotational speed of the dosing roller should be increased. One or more deviation plates may be positioned in the lower chamber to assist the distribution of the glass beads over the whole surface of the distribution grids.

By means of the apparatus according to the invention, a uniform distribution of the glass beads is achieved in an amount required for the marking line, within the limits of that line and without significant spillage onto other parts of the road surface. The distribution grids are conveniently mounted in a static position relative to the housing, thereby avoiding any problems of wear and maintenance which arise with moving parts. The distribution grids serve to distribute the glass beads uniformly without the consumption of energy, save for the vibration which is present in any case. In contrast to some prior art devices, the use of compressed air to distribute the glass beads is avoided. A simple, efficient and relatively maintenance-free apparatus is thereby provided.

If one desires to deposit two or more different types of glass beads (for example, having different diameters or carrying different coatings) onto the same marking line, it is preferred to provide an apparatus according to the invention for each type of glass bead, these apparatus being mounted on a common machine which also carries the paint and/or polymer application devices, mounted ahead of the glass bead distribution apparatus.

BRIEF DESCRIPTION OF THE DRAWING

The invention will now be further described, by way of example, with reference to the accompanying drawings, in which.

DESCRIPTION OF THE PREFERRED EMBODIMENTS

Figure 1:
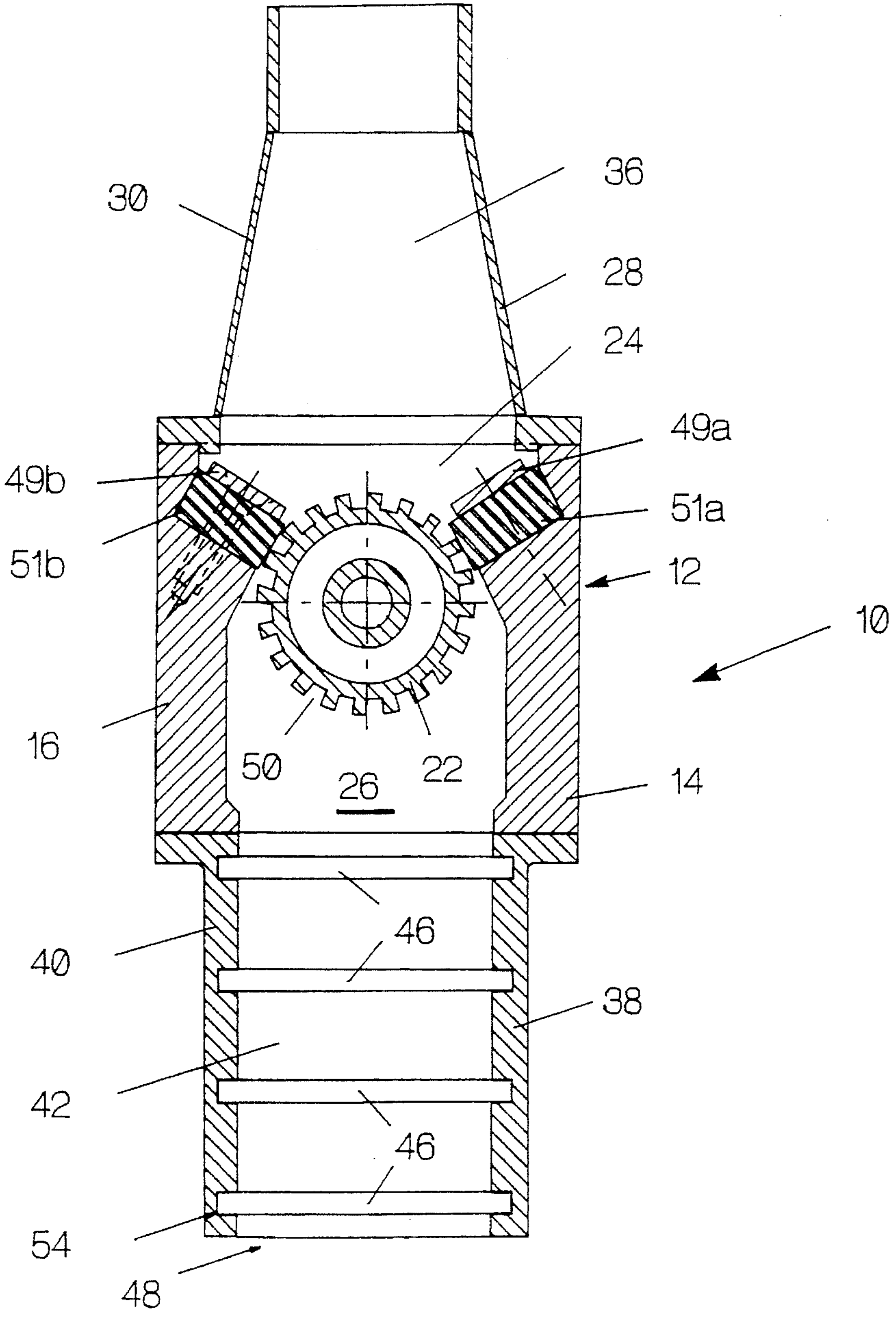
FIG. 1 is a side elevational cross-sectional of an apparatus according to the invention.
Figure 2:
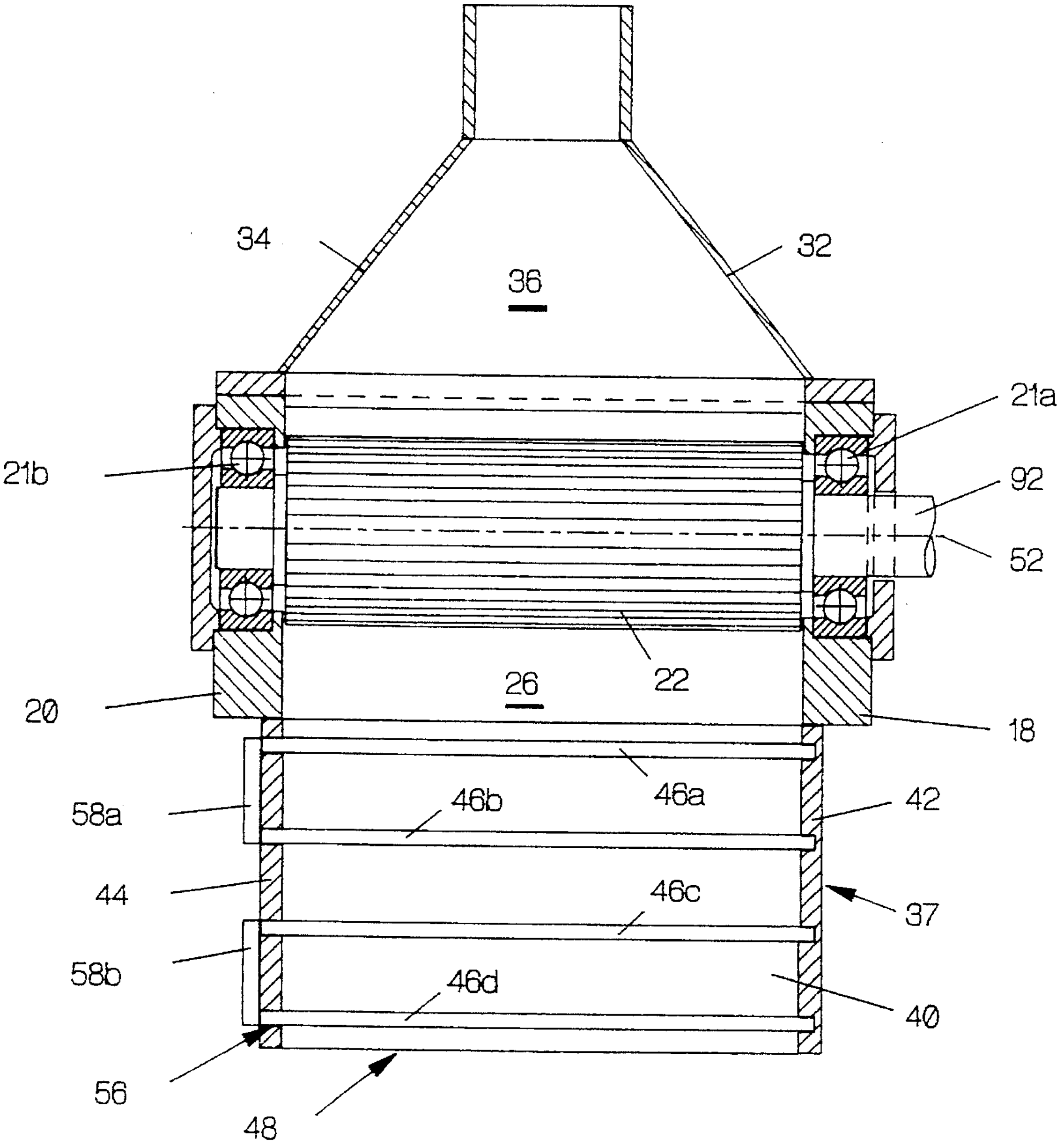
FIG. 2 is a front elevational cross-sectional of the apparatus shown in FIG. 1.

Referring to FIGS. 1 and 2 of the drawings, the apparatus 10 comprises a housing 12 defined by a front primary wall 14, a rear primary wall 16 and side primary walls 18, 20. Within the housing 12 and supported in a generally horizontal disposition by bearings 21*a*, 21*b* carried in the side primary walls 18, 20 is positioned a grooved dosing roller 22 dividing the housing 12 into an upper chamber 24 and a lower chamber 26. The housing 12 includes upper front, rear and side walls 28, 30, 32 and 34 which are so shaped as to define a hopper 36 for the receipt of glass beads or other particulate material which is desired to distribute onto the road surface. The lower part of the apparatus 10 is constituted by a distribution grid support assembly 37 formed of front, rear and side support walls 38, 40, 42 and 44 which support a number of distribution grids 46, in the case of the embodiment shown in these drawings, four such grids 46*a*, 46*b*, 46*c* and 46*d*. The support walls 38, 40, 42 and 44 at their lower extremity define a downwardly directed opening 48 of the housing 12.

The dosing roller 22 acts as a feeding control means for feeding the glass beads from the upper chamber 24 to the lower chamber 26. Mounted on the front and rear primary walls 14, 16 of the housing 12 are deflector plates 49*a*, 49*b* set at an angle of 30° to the horizontal to deflect the glass beads from the hopper 36 towards the dosing roller 22. The dosing roller 22 has grooves 50 extending in a direction parallel to the axis 52 of the dosing roller 22. The number of grooves 50, and their dimensions, are determined by the desired rate of distribution of the beads over the road surface and by the diameter of the beads. We have found that 20 equally spaced grooves, each having a width of 4 mm to be convenient. The plates 49*a*, 49*b* also serve to retain the rubber contact strips 51*a*, 51*b* in position.

The distribution grids 46 are positioned in parallel, one above the other in the lower chamber 26. The front and rear support walls 38, 40 and one side support wall 42 are formed with support grooves 54 on the inwardly facing surfaces to support the front rear and one side edge of the distribution grids 46. The other side support wall 44 has slots 56 formed therein, through which the distribution grids 46 may be inserted and which, in the in-use position, serve to support the remaining side edge of the distribution grids. The upper pair of distribution grids 46*a*, 46*b* are coupled together as a single unit by means of a connecting plate 58*a*. Similarly, the lower pair of distribution grids 46*c*, 46*d* are coupled together as a single unit by means of a connecting plate 58*b*. The connecting plates 58*a*, 58*b* are are fixed to the support wall 44 by bolts (not shown).

Figure 3:
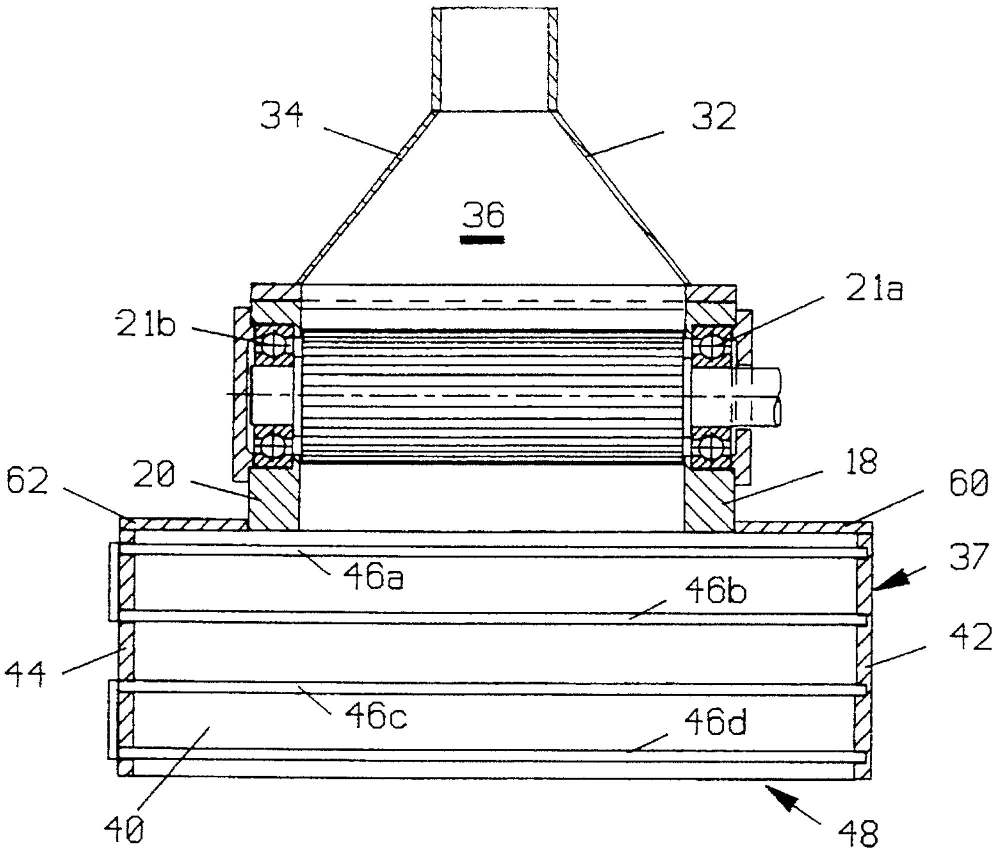
FIG. 3 is a view similar to FIG. 2, of a modified apparatus according to the invention.

In the embodiment shown in FIG. 3, identical reference numbers are used for features similar to those seen in FIGS. 1 and 2. However, this embodiment differs in that the lower side support plates 42, 44 are coupled to the primary side plates 18, 20 by way of intermediate plates 60, 62. Thus, the sideways dimension of the lower chamber 26 and the downwardly directed opening 48 in the embodiment shown in FIG. 3 is greater than that of the upper chamber 36 and is greater than the length of the grooved dosing roller 22. The intermediate plates 60, 62 may be secured to the primary side plates 18,20 in any suitable manner, in particular in a releaseable manner, enabling the distribution grid support assembly 37 to be removed and replace with an assembly with distribution grids of a different dimension. A rectangular distribution plate (not shown) may be added above the upper distribution grid 46*a*, at the centre thereof, to cause the glass beads reach the extremities of the upper distribution grid more rapidly. The dimensions of this distribution plate may be related to the size of the distribution grids.

Figure 5:
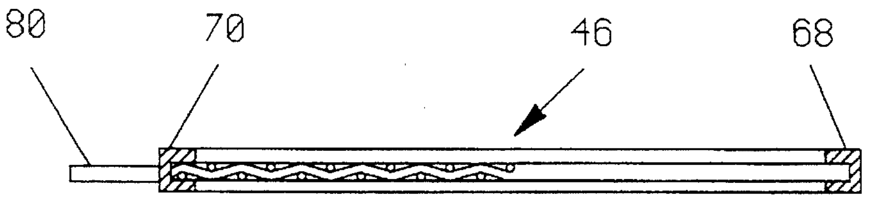
FIG. 5 is a side cross-sectional view of a distribution grid shown in FIG. 4, taken on the line V—V in FIG. 4.
Figure 4:
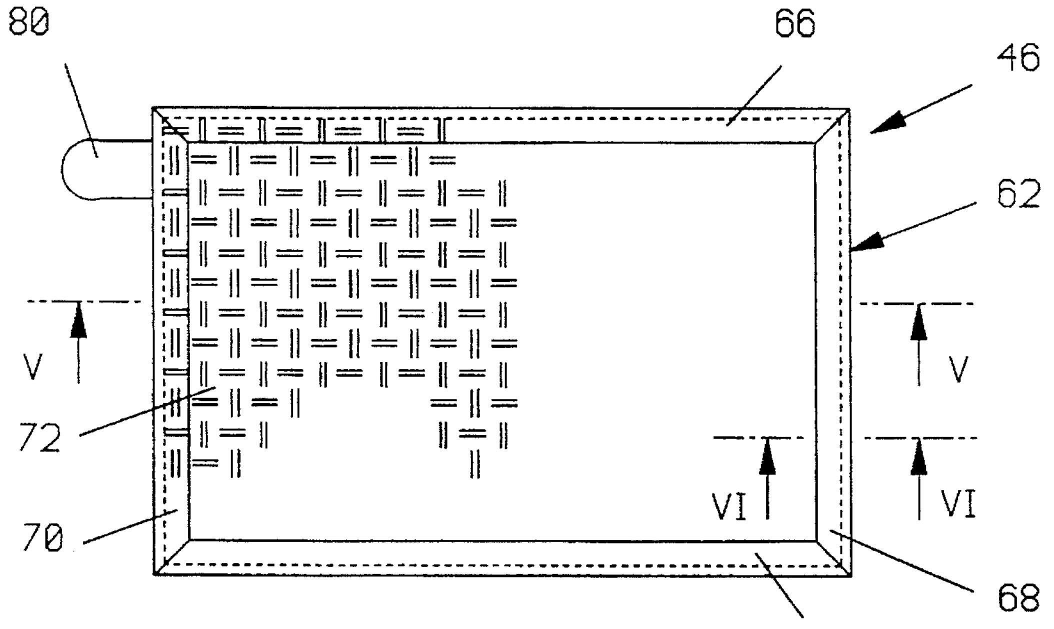
FIG. 4 is a plan view of the distribution grid suitable for use in the apparatus shown in FIG. 1.
Figure 6:
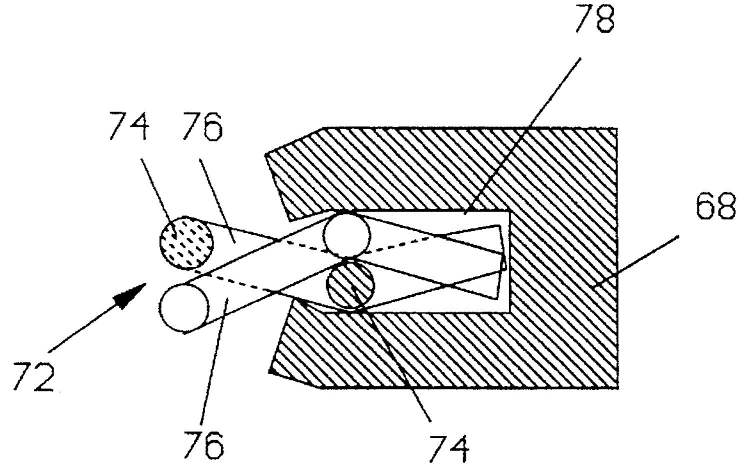
FIG. 6 is a cross-sectional view of part of the distribution grid shown in FIGS. 4 and 5, taken on the line VI—VI in FIG. 4.

Referring to FIGS. 4 and 5, there is shown a single distribution grid 46, which comprises a peripheral frame 62 made up of front, rear and opposite side frame members 64, 66, 68 and 70 disposed in the shape of a rectangle. The frame 62 supports a stainless steel wire mesh grid 72, consisting of lateral 74 interwoven with longitudinal wires 76 in the manner indicated in FIG. 6. FIG. 6 also shows that the frame members of the distribution grid 46 are U-shaped in cross-section, having an inwardly directed channel 78, in which the edge of the wire mesh grid 72 is located. One side frame member has attached thereto a handle 80, by means of which the distribution grid 46 may be inserted and withdrawn from the apparatus 10. Where the distribution grids 46 are coupled in pairs, as in the embodiments shown in FIGS. 1 to 3, the handle 80 is positioned on the same side of the distribution grid 46 as the connecting plate 58, and may be integral therewith.

Figure 7:
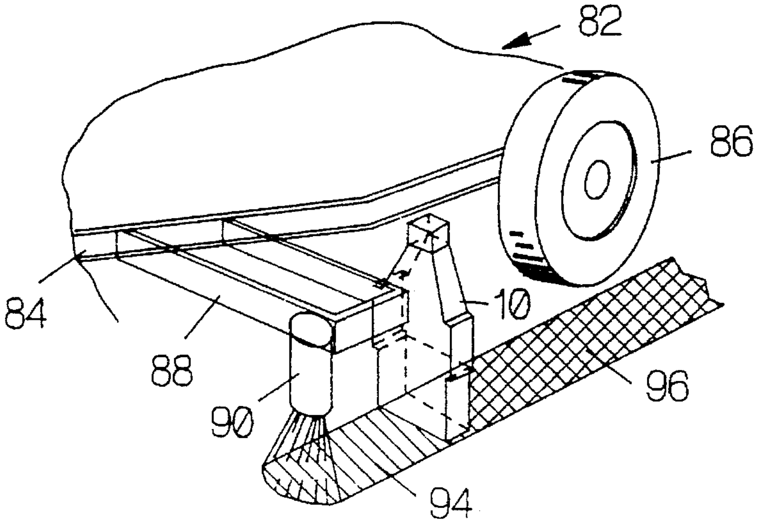
FIG. 7 is a view of the apparatus shown in FIG. 1 forming part of a road marking machine.

Referring to FIG. 7, the apparatus 10 is carried as part of a road marking machine 82, only part of which is shown. The machine 82 comprises a main frame 84 supported for movement over a road surface on a number of wheels 86, some of which may be driven by means not shown. A side arm 88 of the frame 84 projects beyond the tracking line of the wheel 86 and carries at its remote end a paint spraying head 90 and the glass bead distribution apparatus 10. The paint spraying head has associated therewith a paint feed device and a compressor (not shown) to enable the paint to be sprayed from the spraying head 90 in a current of compressed air, these items being mounted on the main frame 84. By mounting the apparatus 10 directly on the machine 82, an advantage is achieved in that vibration from the compressor mounted on the main frame is transmitted to the apparatus 10 to aid in the uniform distribution of glass beads therefrom. The disposition of the apparatus 10 on the machine 82 is such that, as the machine moves forward, the apparatus 10 moves in a direction generally at right angles to the axis of the dosing roller 22, following the paint spraying apparatus exactly. The wheel 86 is linked, by means not shown, to the dosing roller 22 so that as the machine moves forward the roller 22 rotates at a rotational speed proportional to the linear speed of the machine. The amount of glass beads delivered to the distribution grids 46 is thus proportional to the distance covered by the machine 82. This link can be achieved in a convenient manner if the shaft 92 of the roller 22 is extended to carry a sprocket wheel or the like ( not shown) which by means of a chain drive can be connected to the drive means for the machine. The means whereby the wheel 86 is linked to the roller 22 also preferably includes a gear box of known construction having an adjustable gear ratio, such that the quantity of beads applied to the road surface per linear unit distance is adjustable.

In use, the machine 82 is driven forward by motive power or manually. The paint spraying head 90 applies paint to the road surface to form a paint line 94. The apparatus 10 then applies the glass beads uniformly to the freshly applied paint line 94, so as to complete the formation of the marking line 96.

The invention will now be illustrated by the following non-limiting example.

EXAMPLE

In a practical example, a 600 μm thickness coating of acrylic paint (density 1.5) was applied to a road surface in a line having a width of 30 cm (about 900 g/$m^2$ of paint). For adjustment of the retro-reflectivity of the marking line in rainy conditions, about 200 g/$m^2$ of Vialux (Trade Mark) glass beads having a diameter between 1 and 2 mm were initially deposited upon the freshly applied paint. Thereafter, from 1.4 to 1.6 Kg/$m^2$ of Tecnoperl (Trade Mark) glass beads was applied. The weight ratio of paint to Tecnoperl glass beads was between 1.5 and 2. The Tecnoperl glass beads have a granulometry of between 100 and 700 μm and carry a peroxide as initiator for the polymerisation of the paint. Following the application of the glass beads, the thickness of the marking line had increased to 2 mm. In order to carry out this process, a distribution apparatus for the Vialux beads is disposed on a paint applicator machine just behind the paint spraying head. The dosing roller of the distribution apparatus has a length of 15 cm and an external diameter of 5 cm. Four distribution grids were used, each having a length of 30 cm, corresponding to the width of the marking line. The mesh opening in the distribution grids was about 1.4 mm. Mounted behind the Vialux distribution apparatus was a Tecnoperl distribution apparatus similarly constructed, except that the mesh opening in the distribution grids was 3.0 mm.

What is claimed is:

1. An apparatus for the distribution of particulate material including glass beads onto one of freshly applied paint or polymer material applied to a surface, comprising:

a housing having defined therein an upper chamber for the receipt of particulate material, having defined therein a lower chamber including a downwardly directed opening, and having feeding control means positioned between the upper chamber and the lower chamber to allow the particulate material to pass in a controlled manner from the upper chamber to the lower chamber wherein at least one distribution grid is positioned in the lower chamber through which substantially all of the particulate material to be applied onto the surface passes to the downwardly directed opening.

2. The apparatus according to claim 1, wherein at least two distribution grids are provided in the lower chamber.

3. The apparatus according to claim 1, wherein the at least one distribution grid is removable from the lower chamber.

4. The apparatus according to claim 1, wherein the at least one distribution grid includes mesh openings, and wherein the mesh openings in the at least one distribution grid have a size ranging from 750 μm to 2400 μm.

5. The apparatus according to claim 4, wherein the mesh openings in the at least one distribution grid have a size ranging from 1000 μm to 1800 μm.

6. The apparatus according to claim 1, wherein the at least one distribution grid includes mesh openings, and wherein the mesh openings in the at least one distribution grid have a size ranging from 2 mm to 8 mm.

7. The apparatus according to claim 6, wherein the mesh openings in the at least one distribution grid have a size ranging from 3 mm to 6 mm.

8. The apparatus according to claim 1, wherein the lower chamber is provided with support means enabling the disposition therein of at least two distribution grids having respective mesh openings having sizes which differ.

9. The apparatus according to claim 1, wherein one of (a) each of the at least one distribution grid or (b) a group of distribution grids of the at least one distribution grid, has a form of a rectangular drawer, which rectangular drawer may be slid into and out of position in the lower chamber.

10. The apparatus according to claim 1, wherein the feeding control means comprises a rotatable distribution roller.

11. The apparatus according to claim 10, wherein the rotatable distribution roller has an axis of rotation, and wherein the at least one distribution grid is disposed in a generally parallel relationship to the axis of the rotatable distribution roller and, when at least two distribution grids are provided, respective distribution grids are additionally disposed in a generally parallel relationship to each other.

12. The apparatus according to claim 10, wherein the rotatable distribution roller has an axis of rotation, and wherein the rotatable distribution roller is a grooved dosing roller, having a plurality of grooves extending in a direction generally parallel to the axis thereof.

13. apparatus according to claim 10, wherein the rotatable distribution roller has a length, and wherein the lower chamber is provided with support means enabling the disposition therein of one or more distribution grids each having a length which is greater than the length of the rotatable distribution roller.

* * * * *